United States Patent
Kaniushko et al.

(10) Patent No.: US 8,019,651 B2
(45) Date of Patent: Sep. 13, 2011

(54) METHOD, SYSTEM, AND COMPUTER USABLE MEDIUM FOR ENSURING PURCHASERS ARE CHARGED A MOST FAVORABLE PRICE

(75) Inventors: Mikhail Ivanovich Kaniushko, Minsk (RU); Joanne O'Lear, Raleigh, NC (US); William J. Reilly, Cary, NC (US); Marco Wahler, Gressthl (GE)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/341,231

(22) Filed: Dec. 22, 2008

(65) Prior Publication Data

US 2010/0161497 A1 Jun. 24, 2010

(51) Int. Cl.
*G06Q 30/00* (2006.01)
*G06F 17/30* (2006.01)

(52) U.S. Cl. .......... 705/26.1; 705/26.2; 705/26.41; 705/26.8

(58) Field of Classification Search ........ 705/26.1–27.2, 705/80
See application file for complete search history.

(56) References Cited

U.S. PATENT DOCUMENTS

| | | |
|---|---|---|
| 6,993,494 B1 | 1/2006 | Boushy et al. |
| 7,295,989 B2 | 11/2007 | Rudnick |
| 2002/0087421 A1 | 7/2002 | Mantena et al. |
| 2002/0123958 A1 | 9/2002 | Hara et al. |
| 2002/0165771 A1 | 11/2002 | Walker et al. |
| 2003/0050901 A1 | 3/2003 | Jester et al. |
| 2003/0139996 A1* | 7/2003 | D'Antoni et al. .......... 705/37 |
| 2004/0015367 A1 | 1/2004 | Micastro et al. |
| 2004/0267676 A1 | 12/2004 | Feng et al. |
| 2005/0159974 A1* | 7/2005 | Moss et al. .......... 705/1 |
| 2006/0041496 A1 | 2/2006 | Amin |
| 2007/0150334 A1 | 6/2007 | Bergh et al. |
| 2008/0168008 A1* | 7/2008 | Brown .......... 705/400 |

OTHER PUBLICATIONS

"Ziff's 'Computer Shopper' to bow on Web with NetBuyer". Jane Hodges. Advertising Age , p. 44 , Sep. 9, 1996.*

* cited by examiner

*Primary Examiner* — Will Allen
(74) *Attorney, Agent, or Firm* — J. B. Kraft; Steven L. Bennett

(57) ABSTRACT

A network Web service indirect channel distribution system, method and computer program that ensures purchasers are charged the most favored prices. An implementation enabling a system host to negotiate prices for vendor registered goods and services, means for modifying the host negotiated prices and means enabling a purchaser to negotiate a special price for registered goods and services in a specific purchase transaction. An entitled price repository independent of the above-described indirect channel distribution system is associated with this entitled price repository for tracking a plurality of price affecting factors selected from a group of such factors comprising the host negotiated prices, the above-described modified prices, and the specific purchase transaction prices. The entitled price repository correlates all of these price affecting factors to produce a most favored price for the customer/purchaser.

9 Claims, 4 Drawing Sheets

METHOD, SYSTEM, AND COMPUTER USABLE MEDIUM FOR ENSURING PURCHASERS ARE CHARGED A MOST FAVORABLE PRICE

TECHNICAL FIELD

The present invention relates to distribution of data over the World Wide Web network (Web) (the term is used interchangeably herein with Internet Protocol networks), and particularly to the distribution of data entities using Web Services standards and protocols.

BACKGROUND OF RELATED ART

The ease with which great volumes of data may be transmitted from a computer attached to the Web and equipped with a Web browser has led to the development of widespread electronic commerce over the Web. At the present time, it is becoming very rare to find a business organization of any kind that does not transact some aspect of the business via the Web. As consumers and businesses become more familiar and comfortable with Web transactions, they become more and more willing to try the Web for all aspects of electronic commerce.

With the development and rapid expansion of the Web and other like networks, hypertext markup languages became the primary vehicle for distribution of data over such networks. A basic hypertext language, HTML, is described in detail in the test *Just Java* text, $2^{nd}$ Edition, Peter Vanderlinden, Sun Microsystems, Inc., 1997, particularly at Chapter 7, pp. 249-268, dealing with handling Web pages; and also in the text, *Mastering the Internet*, G. H. Cady et al., published by Sybex Inc., Alameda, Calif., 1996, particularly at pp. 637-642, on HTML in the formation of Web pages. The Web pages are implemented so as to be used for the distribution of Web documents containing text, images, both still and moving, and sound, as well as programs.

The above three rapidly evolving technologies: the Web distribution network; object oriented programming; and hypertext markup languages, have now all been correlated into a system for distribution and exchange via the Web of data between any two computer applications. The system is specifically known as Web Services. The system is based on both suppliers of the data in the form of text based documents and the users of such data conforming to several industry standards developed by the Word Wide Web Consortium (W3C). The primary standard is Extensible Markup Language (XML) for defining data and creating markup languages in -the form of XML tags. The resulting XML documents are text based and, thus, may be processed on any platform in the (distribution of the Web Services. Accordingly, suppliers who wish to offer their Web Services must qualify the proposed services according to the following standards:
XML: a hypertext markup language extensively used in the distribution of Web Services and other electronic business components over the Web. (For a basic description of Web Services, reference is made to the text: *Web Services, A Technical Introduction*, H. M. Deitel et al., published 2003, Prentice Hall, Upper Saddle River, for general information and particularly to Appendix A, pp. 319-334.)
(SOAP) Simple Object Access Protocol: a protocol established to enable the programming objects that form part of the XML items being distributed to communicate with each other via messages (Chapter 6 of the above text).
(UDDI) Universal Description, Discovery and Integration Registry: where suppliers or developers may list their Web Services offered for distribution, i.e. advertise their Web Services.
(WSDL) Web Services Description Language: an XML language used by suppliers and developers for describing the offered Web Services on the UDDI Registry. (Also described in detail in Chapter 6 of the above-mentioned text.) It should be noted that WSDL is a language intended to be read by computer applications rather than human beings. Thus, all messages generated, including fault messages, are read by applications.

To users (purchasers) and suppliers (vendors) of Web Services who are qualified in all of the above-required standards, the system has been efficient in the distribution of services over the Web. The items have been selected by interested users from the UDDI, distributed over the Web from the suppliers to such requesting users and subsequently billed to and tracked, if necessary, by the requesting user. This has been done with a minimum of human, i.e. person-machine intervention being necessary; which, of course, is one the advantages and goals of Web distribution.

In indirect channel distribution of services by registered vendors to purchasers, it is often the case that two or more registered service vendors, who are frequently business partners of the host, contribute to the provision of the service. The purchaser may negotiate special purchase pricing for specific purchases. Special customer, i.e. purchaser discounts may be introduced into the indirect channel distribution system from time to time. Also, from time to time, business partners may be offered addenda from the host wherein the partner, by accepting an addendum, agrees to specified prices with respect to specified services offered to the purchasers. With all these potential activities progressing with a minimum of human intervention, i.e. person-machine or person to person intervention, it is understandable that any customer may become wary that the eventual price generated by the system to be charged to the customer/purchaser may not be the most favorable price.

There is consequently a need in the pricing of goods and services transmitted and delivered through indirect channel distribution via Web services to have a uniform pricing system through which a purchaser may have the comfort of knowing that he is getting best price, which will be referred to the most favored price for services and goods delivered via indirect channel distribution. There is also a need for pricing systems that are easy to check and to interpret should questions concerning obligations and pricing arise.

SUMMARY OF THE PRESENT INVENTION

The present invention provides a Web communication network Web service indirect channel distribution system, method and computer program that ensures purchasers are charged the most favored prices wherein the elements that contribute to pricing are also very easy to access and interpret should any questions arise.

The implementation comprises the combination of means enabling a system host to negotiate prices for vendor registered goods and services, means for modifying the host negotiated prices and means enabling a purchaser to negotiate a special price for registered goods and services in a specific purchase transaction, among other price determinants. The invention further provides for an entitled price repository independent of the above-described indirect channel distribution system, together with means associated with this entitled price repository for tracking a plurality of price affecting factors selected from a group of such factors comprising the host negotiated prices, the above-described modified prices and the specific purchase transaction prices.

The invention further includes means associated with the entitled price repository for charging the purchaser a most favored price for purchased goods and services resulting from a combination of the price affecting factors. By most favored price is meant the price that maximizes all of the favorable aspects of the price affecting factors. An interface is provided between the indirect channel distribution system and the independent entitled price repository.

In the practice of the invention, there are means for storing, in the entitled price repository, a purchaser identifier, and also storing the purchaser identifier in the indirect channel distribution system so that the purchaser in the indirect channel distribution system is associated with the purchaser related data in the entitled price repository.

In accordance with a more particular aspect of this invention, a set of registered business partners of the host provide the distributed goods and services, and the business partners are enabled to register for addenda offered by said host that modify negotiated prices. In such situations, the implementations for tracking the entitled price repository for tracking also track prices provided via these addenda. An implementation is provided for storing, in the entitled price repository, an addendum identifier and also storing the addendum identifier in the indirect channel distribution system so that the particular addendum in the indirect channel distribution system is associated with the addendum related data in the entitled price repository.

In accordance with another particular aspect of this invention, there is provided a display interface interconnected between the entitled price repository and the indirect channel distribution system for providing error messages in response to validation failures between the entitled price repository and the indirect channel distribution system together with user interactive display means enabling a user to correct said validation failures.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
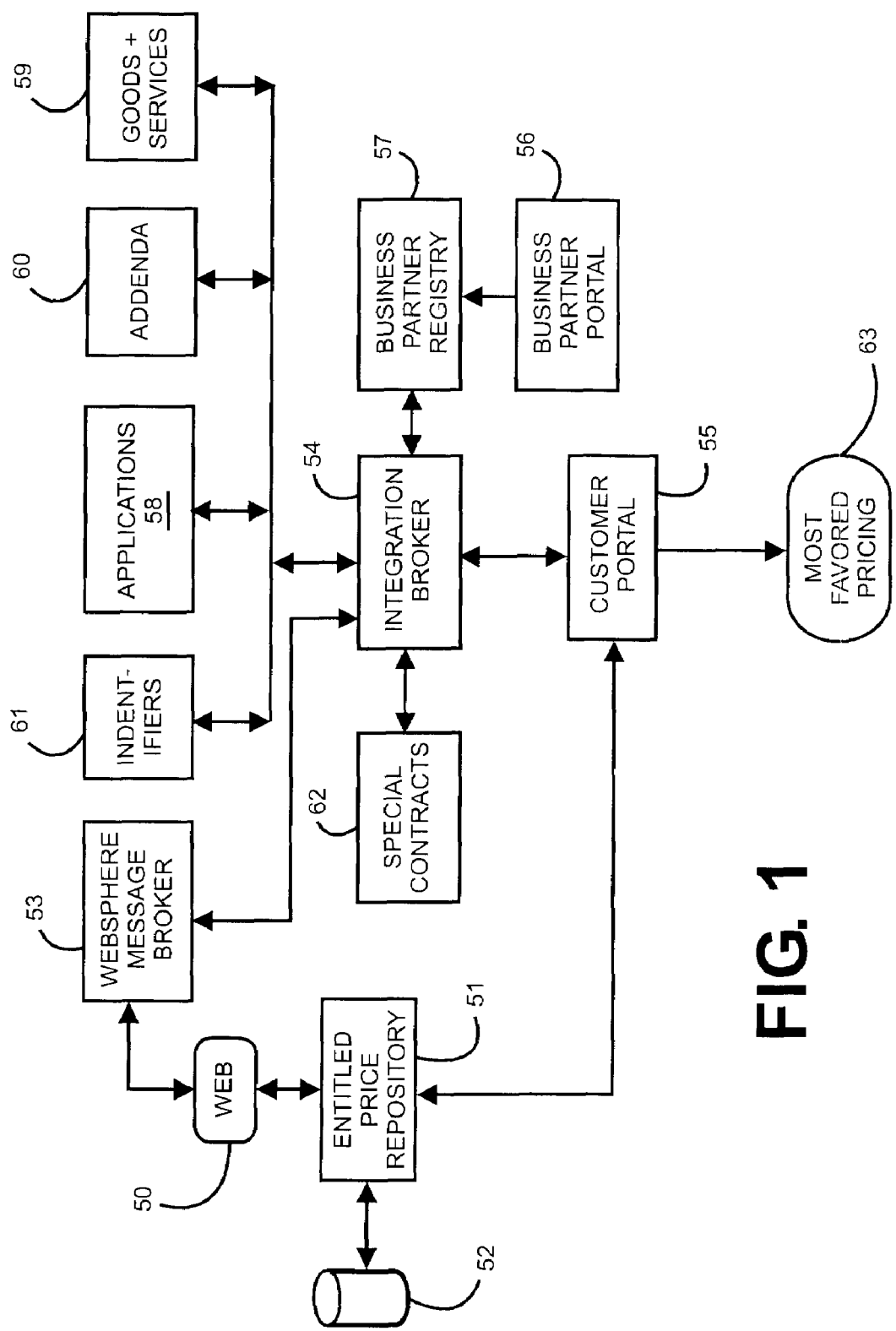
FIG. 1 is a generalized diagrammatic view of a Web network portion, including appropriate WebSphere message brokers and integration brokers, upon which the present invention involving an entitled price repository for tracking indirect channel sales transactions may be implemented.

Referring to FIG. 1, there is shown a generalized diagrammatic view of a Web network portion, including appropriate WebSphere message brokers and integration brokers, upon which the present invention involving an entitled price repository for tracking indirect channel sales transactions may be implemented. For further background details of any of the generally described elements, reference may be made to the above-described *Web Services, A Technical Introduction*, H. M. Deitel et al., published 2003, and more specifically to the publication, *Integrating SAP Solutions with IBM WebSphere Products, an interoperability survey*, published Jul. 6, 2005, by International Business Machines Corporation (IBM).

In FIG. 1, the customer or purchaser, who is appropriately registered and identified by a customer number to purchase Web services, may access the indirect channel distribution system shown through customer portal 55 that is a Web interactive display station described in detail subsequently with respect to FIG. 2. Vendors of Web services may register to provide services under terms negotiated with the indirect channel distribution system host, e.g. a distributer such as IBM. While vendors do not necessarily have to be business partners, they will be business partners for the purpose of this illustration.

Thus, business partners access the indirect channel system via business partner portal 56 that may also be a Web interactive display station described in detail subsequently with respect to FIG. 2. The business partners register via business partner registry 57 to provide, for example, specific goods and services selected from a library of such goods and services 59 or applications 58. Likewise, a registered customer or purchaser may select to purchase selected applications 58 or services 59. The registered customers and business partners are assigned appropriate identifiers from an identifier database 61 that tracks such identifiers for the indirect channel distribution system. Assuming that in a particular transaction one or more registered business partners are combining to provide services to a customer under standard registered terms, the transaction will be integrated via the integration broker 54 for delivery of such services to the customer/purchaser through the customer portal 55. All of the elements of the specific transaction are stored in association with the integration broker 54 that also transmits this data to the wholly independent entitled price repository 51 via WebSphere message broker 53 that is connected via the Web 50 and this data is stored in an associated database 52. It should also be understood that a customer may negotiate a special contract with the host, the terms of such special contracts are stored in a database 62 associated with integration broker 54 that integrates the special contract terms into the transaction between the customer and business partners. These special terms are also transmitted to the entitled price repository 51 via WebSphere message broker 53 and stored in an associated database 52.

From tine to time, business partners will be offered addenda 60 to services that the partners are registered to provide. When a partner registers to accept an addendum, that registration is stored in association with the addendum function 60 for the benefit of the indirect channel transmission system, and assigned an identifier from identifier database 61.

The identification of the business partner, the registered addendum and its identifier are also transmitted via WebSphere message broker 53 via the Web 50 to the independent entitled price repository 51 where the data is stored in associated database 52.

With the foregoing set up, all transactions, e.g. selection and registration of a modifying addendum by a business partner, additional business partners becoming involved in purchaser's purchase transaction for indirect channel services, special contract deals being offered during the fulfilling of the purchaser's contracted transaction for services, etc., instead of being stored at various points in connection with their associated functions in the indirect channel transmission system network, all such transactions would also be stored in a single repository 51, independent of and remote from the transmission system. The data representative of all such transactions is stored in this entitled price repository 51.

With such an arrangement, appropriate algorithms or business rules could be provided to calculate the most favored price 63 in the entitled price repository 51 that is then provided to the purchaser through the customer portal 55.

Referring to FIG. 1, a typical data processing terminal is shown that may function as the receiving Web station on which the purchaser may request and receive Web Services from registered vendors. The system may be used for all of the other computers used in the present invention, including conventional servers used throughout the Web for controlling the entitled price repository, Websphere message brokers and integration brokers.

In FIG. 1, a central processing unit (CPU) 10, such as one of the PC microprocessors or workstations, e.g. System p series available from IBM, is provided and interconnected to various other components by system bus 12. An operating system 41 runs on CPU 10, provides control and is used to coordinate the function of the various components of FIG. 1. Operating system 41 may be one of the commercially available operating systems. Application programs 40, controlled by the system, are moved into and out of the main memory Random Access Memory (RAM) 14. These programming applications include all of the Web Services programs discussed above for the practice of the present invention that will also be described hereinafter for operations wherein the system of FIG. 1 functions for the purchase and transmission of services in the indirect channel system with an entitled price repository.

A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with an outside Web or like network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of this invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through keyboard 24 or mouse 26 and receiving output information from the system via display 38.

Figure 2:
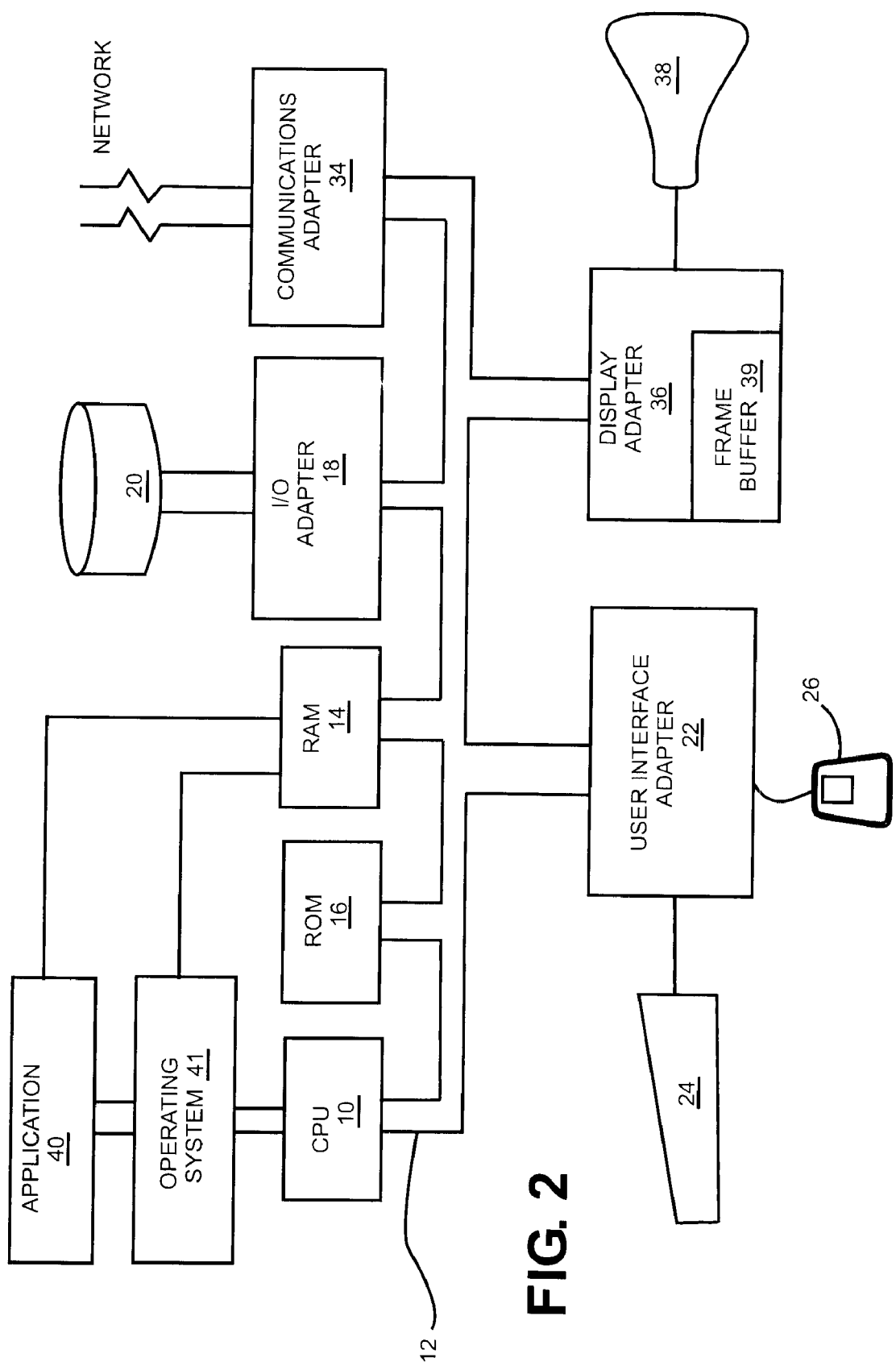
FIG. 2 is a block diagram of a data processing system including a central processing unit and network connections via a communications adapter that is capable of implementing the receiving Web stations on which the purchaser may request and receive Web Services from registered vendors. The system may be used for all of the other computers used in the present invention, including conventional servers used throughout the Web including servers controlling the entitled price repository, WebSphere message brokers and integration brokers.
Figure 3:
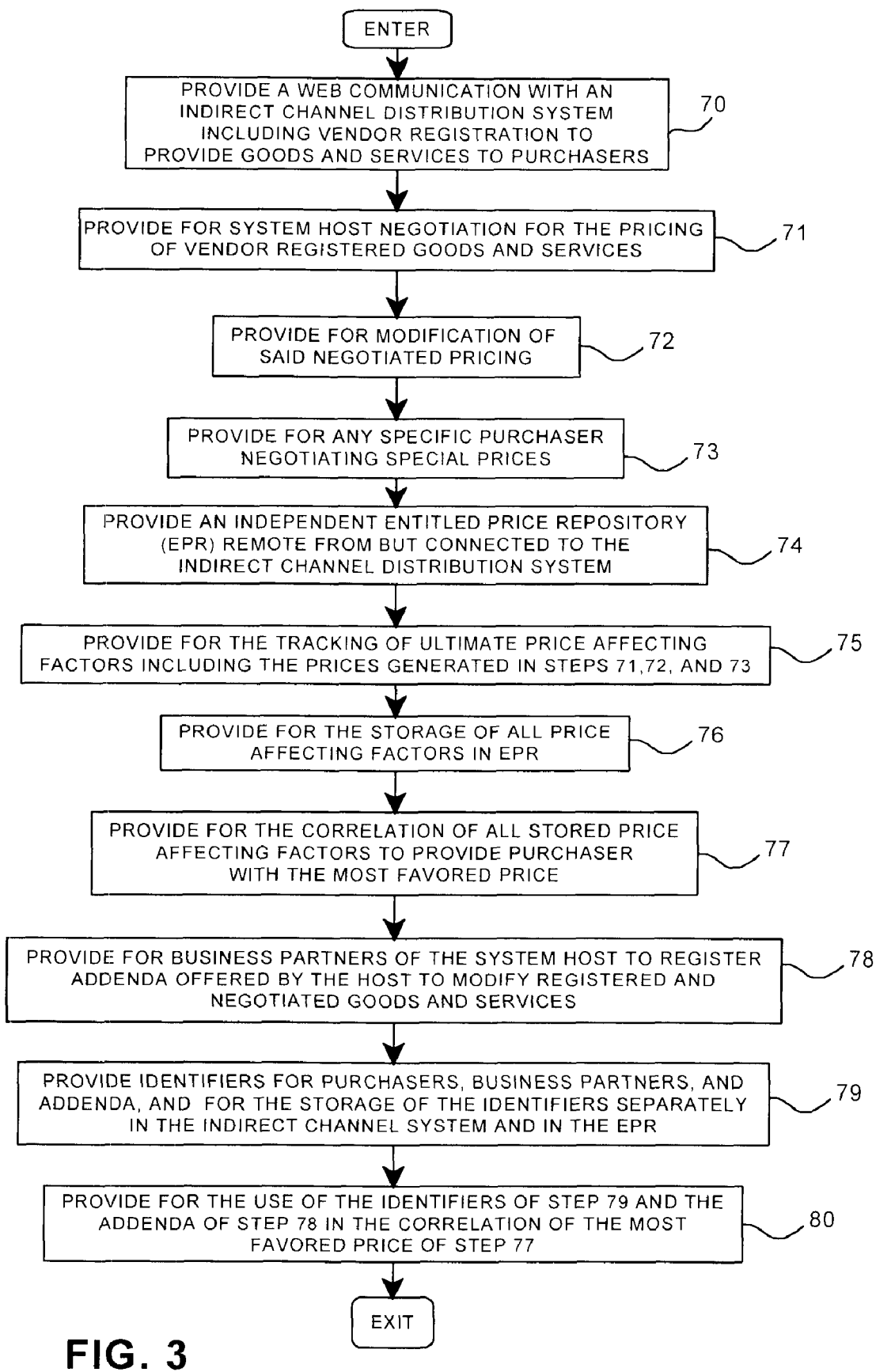
FIG. 3 is a general flowchart of a program set up to implement the present invention for the purchase and transmission of services in the indirect channel system with an entitled price repository of the present invention.

FIG. 3 is a flowchart showing the development of a process according to the present invention for the purchase and transmission of services in the indirect channel system with an entitled price repository of the present invention. Many of the programming functions in the process of FIG. 3 have already been described in general with respect to FIGS. 1 and 2. In a Web environment, there is provided an indirect channel distribution system including vendor registration for providing goods and services to purchasers, step 70. Within this environment, there is provided system host negotiation for the pricing of vendor registered goods and services, step 71. There is further provided a function for modification of the host/vendor negotiated prices, step 72. Provision is made for purchasers negotiating special pricing, step 73. Provision is made for an independent entitled price repository (EPR) remote from, but connected to, the indirect channel distribution system, step 74. Provision is made, step 75, for the tracking for all price affecting factors including the prices generated in steps 71, 72 and 73. Provision is made for the storage of all price affecting factors in the EPR, step 76. Provision is made for the correlation of all stored price affecting factors to thereby provide a purchaser with the most favored price, step 77.

Provision is made for business partners of the system host to register addenda offered by the host to modify registered and negotiated goods and services, step 78. Provision is also made for the assignment of identifiers to purchasers, business partners and addenda, and for the storage of these identifiers separately in both the indirect channel distribution system and in the EPR, step 79. Finally, provision is made for the use of the identifiers of step 79 and the addenda of step 78 in the correlation of the most favored price of step 77.

Figure 4:
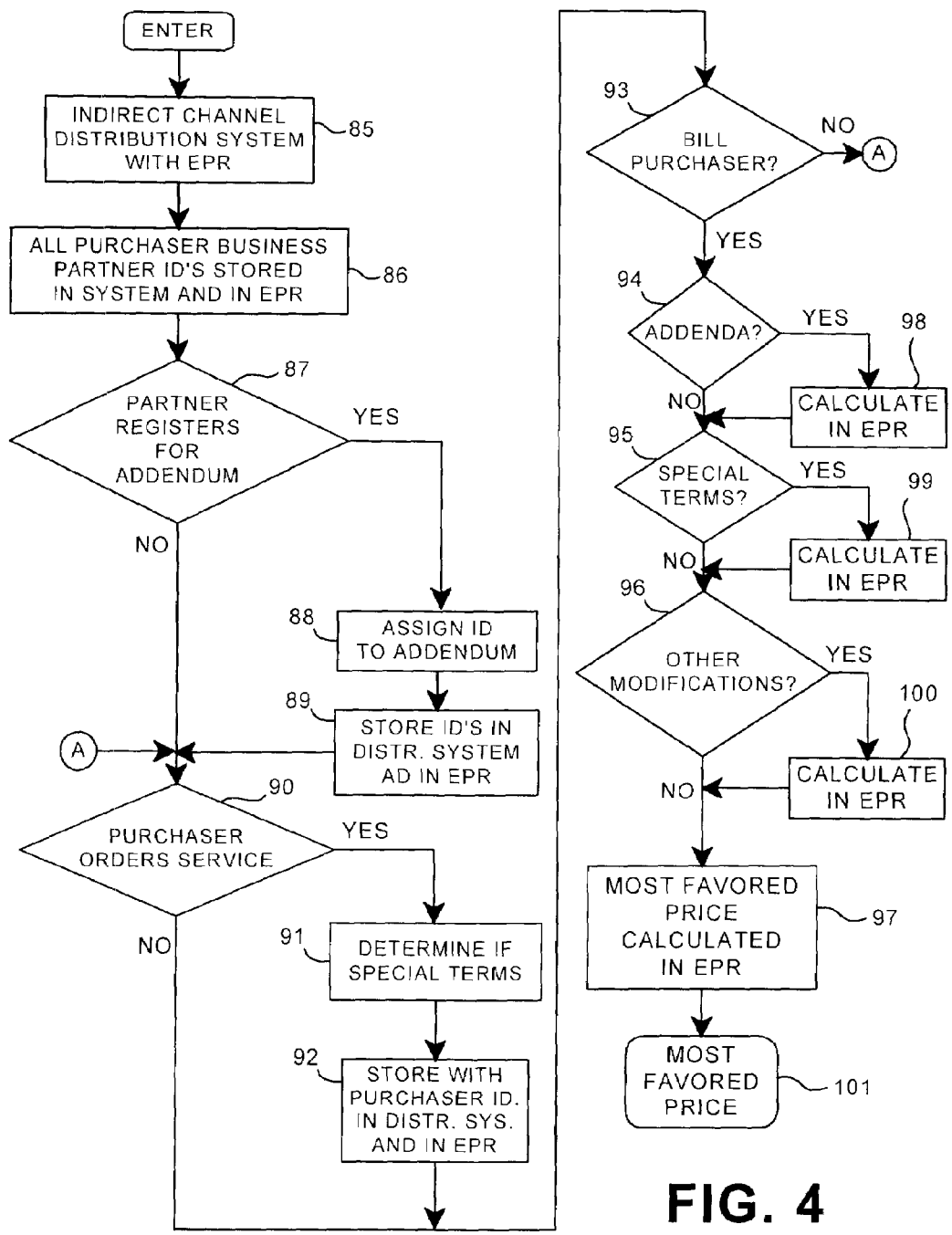
FIG. 4 is a flowchart of an illustrative run of the program set up in FIG. 3.

The running of the process set up in FIG. 3 will now be described with respect to the flowchart of FIG. 4. First, in the running of an indirect channel distribution system with EPR, step 85, all purchaser and business partner IDs are stored in the indirect channel distribution system and in the EPR, step 86. A determination is made, step 87, as to whether a business partner has registered for an addendum. If Yes, an ID is assigned to the business partner selected addendum, step 86, and the assigned ID is stored associated with the distribution system and independently in the EPR, step 89. Then, or if the determination in step 87 is No, a determination is made, step 90, as to whether a purchaser has ordered a service. If Yes, then a determination is made as to whether there are any special terms accorded to the purchaser, step 91, and any special terms are stored in association with the user ID in both the distribution system and in the EPR, step 92. Next, or if the determination in step 90 was No, a determination is made in step 93, as to whether the purchaser is ready to be billed. If No, the process is returned to step 90 via branch "A". If Yes, a further determination, step 94, is made as to whether addenda were involved in the purchase transaction. If Yes, the effect of such addenda is included and calculated in the EPR, step 98. Then, or if the decision in step 94 is No, a determination is made, step 95, as to whether there are special terms involved in the purchase transaction. If Yes, the effect of such special terms is included calculated in the EPR, step 99. Then, or if the decision in step 95 is No, a further determination is made, step 96, as to whether there are other modifications involved in the purchase transaction. If Yes, the effect of such other modifications are included and calculated in the EPR, step 100. Then, or if the decision in step 96 is No, all of the effects resulting from steps 98, 99 and 100 are correlated, using algorithms or rules appropriate to the Web business services involved, to provide the most favored price for the purchaser as calculated in the EPR, step 97, and this most favored price is provided to the purchaser, step 101.

One of the implementations of the present invention may be in application program 40 made up of programming steps or instructions resident in RAM 14, FIG. 2, of a Web server or Web receiving station during various Web operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a network, such as the Web itself, when required by the user of the present invention.

Although certain preferred embodiments have been shown and described, it will be understood that many changes and modifications may be made therein without departing from the scope and intent of the appended claims.

What is claimed is:

1. A method associated with an indirect channel for distribution of goods and services, said method for ensuring that purchasers of said goods and services are charged the most favored prices, the method comprising:
    enabling a system host to negotiate prices for vendor registered goods and services;
    enabling modification of said host negotiated prices for said registered goods and services;
    enabling a purchaser to negotiate a special price for said registered goods and services in a specific purchase transaction;
    determining, by a computer, a most favored price for purchased goods and services by carrying out an entitled price method, said entitled price method comprising:
        tracking a plurality of price affecting factors including prices modified by said host of said registered goods and services and at least one of said host negotiated prices or said specific purchase transaction price;
        enabling a set of business partners of said host to register to provide said registered goods and services;
        storing, in an entitled price repository a purchaser identifier for said purchaser, said entitled price repository independent from but associated with said indirect channel;
        defining a set of registered business partners of said host providing said registered goods and services;
        enabling said set of business partners to register for addenda offered by said host, said addenda including said prices modified by said host for said registered goods and services;
        tracking prices provided by said addenda in said entitled price repository;
        storing, in said entitled price repository an addendum identifier for each of said addenda; and
        charging said purchaser a most favored price for purchased goods and services resulting from said price affecting factors, said price affecting factors including said modified prices and at least one of said host negotiated prices or said specific purchase transaction price.

2. The method of claim 1 further including:
    providing an interactive display interface between said independent entitled price repository and said indirect channel; and
    enabling a user to interactively validate, via said display interface, the purchaser identifiers and addenda identifiers stored in said entitled price repository with respect to corresponding purchaser and addenda identifiers in said indirect channel in the determination of said most favored price from said price affecting factors.

3. The indirect channel distribution method of claim 2 further including:
    providing error messages, on said display interface, in response to validation failures; and
    enabling a user to interactively correct said validation failures through said display interface.

4. A computer usable medium having stored thereon a computer readable program for ensuring purchasers of goods and services through a World Wide Web indirect channel distribution system are charged the most favored prices, wherein the computer readable program is executable on a computer to causes the computer to perform a method comprising:
    enabling a system host to negotiate prices for vendor registered goods and services;
    enabling modification of said host negotiated prices for said registered goods and services;
    enabling a purchaser to negotiate a special price for said registered goods and services in a specific purchase transaction;
    determining, by a computer, a most favored price for purchased goods and services by carrying out an entitled price method, said entitled price method comprising:
        tracking a plurality of price affecting factors including prices modified by said host of said registered goods and services and at least one of said host negotiated prices or said specific purchase transaction price;
        enabling a set of business partners of said host to register to provide said registered goods and services;
        storing, in an entitled price repository a purchaser identifier for said purchaser, said entitled price repository independent from but associated with said indirect channel;
        defining a set of registered business partners of said host providing said registered goods and services;
        enabling said set of business partners to register for addenda offered by said host, said addenda including said prices modified by said host for said registered goods and services;
        tracking prices provided by said addenda in said entitled price repository;
        storing, in said entitled price repository an addendum identifier for each of said addenda; and
        charging said purchaser a most favored price for purchased goods and services resulting from said price affecting factors, said price affecting factors including said modified prices and at least one of said host negotiated prices or said specific purchase transaction price.

5. The computer usable medium of claim 4 wherein the computer program when executed further causes the computer to:
    providing an interactive display interface between said independent entitled price repository and said indirect channel; and
    enabling a user to interactively validate, via said display interface, the purchaser identifiers and addenda identifiers stored in said entitled price repository with respect to corresponding purchaser and addenda identifiers in said indirect channel in the determination of said most favored price from said price affecting factors.

6. The computer usable medium of claim 5 wherein the computer program when executed further causes the computer to:

provide error messages, on said display interface, in response to validation failures; and enable a user to interactively correct said validation failures through said display interface.

7. A computer controlled system for ensuring that purchasers of goods and services are charged the most favored of said goods and services, said system comprising:

a processor; and a computer memory holding computer program instructions executable by the processor to perform the method comprising:

enabling a system host to negotiate prices for vendor registered goods and services;

enabling modification of said host negotiated prices for said registered goods and services;

enabling a purchaser to negotiate a special price for said registered goods and services in a specific purchase transaction;

determining, by a computer, a most favored price for purchased goods and services by carrying out an entitled price method, said entitled price method comprising:

tracking a plurality of price affecting factors including prices modified by said host of said registered goods and services and at least one of said host negotiated prices or said specific purchase transaction price;

enabling a set of business partners of said host to register to provide said registered goods and services;

storing, in an entitled price repository a purchaser identifier for said purchaser, said entitled price repository independent from but associated with said indirect channel;

defining a set of registered business partners of said host providing said registered goods and services;

enabling said set of business partners to register for addenda offered by said host, said addenda including said prices modified by said host for said registered goods and services;

tracking prices provided by said addenda in said entitled price repository;

storing, in said entitled price repository an addendum identifier for each of said addenda; and charging said purchaser a most favored price for purchased goods and services resulting from said price affecting factors, said price affecting factors including said modified prices and at least one of said host negotiated prices or said specific purchase transaction price.

8. The system of claim 7, wherein said performed method further includes:

providing an interactive display interface between said independent entitled price repository and said indirect channel; and enabling a user to interactively validate, via said display interface, the purchaser identifiers and addenda identifiers stored in said entitled price repository with respect to corresponding purchaser and addenda identifiers in said indirect channel in the determination of said most favored price from said price affecting factors.

9. The system of claim 8, wherein the performed method further includes:

providing error messages, on said display interface, in response to validation failures; and enabling a user to interactively correct said validation failures through said display interface.

* * * * *